Figure 1:
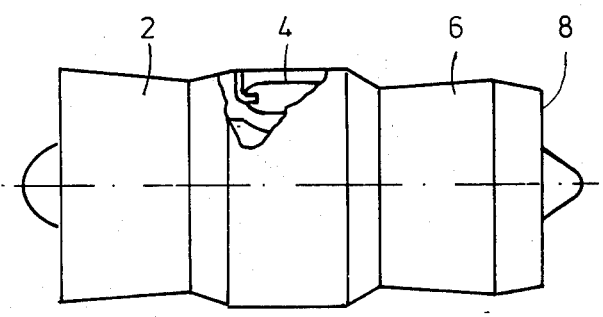

United States Patent
Fox et al.

[11] 3,952,503
[45] Apr. 27, 1976

[54] GAS TURBINE ENGINE COMBUSTION EQUIPMENT

[75] Inventors: Roger Geoffrey Fox; Vernon Frederick Cox, both of Bristol, England

[73] Assignee: Rolls-Royce (1971) Limited, Bristol, England

[22] Filed: Mar. 13, 1974

[21] Appl. No.: 450,689

[30] Foreign Application Priority Data
Mar. 20, 1973 United Kingdom............... 13274/73

[52] U.S. Cl............................... 60/39.65; 60/39.66; 60/39.71
[51] Int. Cl.² ........................ F02C 3/14; F02C 7/22
[58] Field of Search............. 60/39.65, 39.66, 39.71

[56] References Cited
UNITED STATES PATENTS

| | | |
|---|---|---|
| 2,541,900 | 2/1951 | Williams ............................ 60/39.71 |
| 2,930,192 | 3/1960 | Johnson ............................. 60/39.65 |
| 2,973,624 | 3/1961 | Pierce et al. ....................... 60/39.66 |
| 2,974,485 | 3/1961 | Schiefer ............................. 60/39.65 |
| 3,121,996 | 2/1964 | Smith ................................ 60/39.66 |
| 3,430,443 | 3/1969 | Richardson et al. ............... 60/39.71 |
| 3,498,055 | 3/1970 | Faitani et al. ...................... 60/39.65 |
| 3,579,983 | 5/1971 | Caruel et al. ...................... 60/39.71 |
| 3,737,152 | 6/1973 | Wilson .............................. 60/39.65 |
| 3,811,276 | 5/1974 | Caruel et al. ...................... 60/39.65 |

*Primary Examiner*—Carlton R. Croyle
*Assistant Examiner*—Robert E. Garrett
*Attorney, Agent, or Firm*—Stevens, Davis, Miller & Mosher

[57] ABSTRACT

A gas turbine combustion chamber having a continuous annular slot which delivers an inwardly directed annular air curtain into the interior to improve mixing of fuel and combustion efficiency generally.

6 Claims, 4 Drawing Figures

GAS TURBINE ENGINE COMBUSTION EQUIPMENT

The present invention relates to gas turbine engine combustion chambers.

It has been found that one cause of the organic pollutants, such as smoke, carbon monoxide etc., produced in gas turbine engine combustion chambers is that some of the fuel injected remains in the liquid state in the primary combustion zone and this proportion reaches the concave upstream wall of the flame tube. There it forms a thin sheet of fuel and is carried downstream along the flame tube wall, being driven by the general flow of gases inside the flame tube, and, because the wall is relatively cold, and little mixing takes place within streamlines near to the walls, the fuel is only partially burned before it leaves the downstream end of the flame tube.

Some of this fuel may be caught up in the radially inwardly directed air jets entering the flame tube through the primary and secondary air inlet holes in the flame tube wall and through holes drilled in the flame tube wall for other purposes. However, a large part of the liquid fuel in the "sheet" on the wall finds its way between these holes, and recirculation effects around the peripheries of the holes tend, if anything, to reinforce the fuel sheet between the holes.

It is not possible to drill greater numbers of holes in the wall of the flame tube without weakening the wall and disrupting the necessary cooling air film provided over the internal surface of the wall.

The present invention overcomes these disadvantages by providing a completely annular "curtain" of air emanating from the flame tube wall, and at the same time maintaining the cooling film over the wall downstream of the "curtain".

According to the present invention there is provided a gas turbine engine combustion chamber comprising a flame tube having a wall which extends in a direction substantially parallel to the central axis of the engine and which has a substantially annular circumference along at least a major portion of the axial extent thereof, characterized by the provision of a substantially continuous slot extending around the annular circumference and communicating with the interior of the flame tube for the passage of air therethrough into the interior of the flame tube.

According to a feature of the invention, the combustion chamber additionally includes a fuel vaporizer disposed at the head of the flame tube and which comprises a cylindrical stem surrounded by a shroud to define an annular space for receiving a supply of cooling air and wherein holes are provided in the cylindrical surface of the shroud through which all of the cooling air passes out from the space in a direction substantially radially of the stem.

By this means an interaction can be produced between the inwardly directed air barrier extending from the flame tube wall and the substantially radial air jets from the vaporizer shrouds, which promotes improved mixing of the air and fuel in the primary zone of the combustion chamber.

Figure 2:
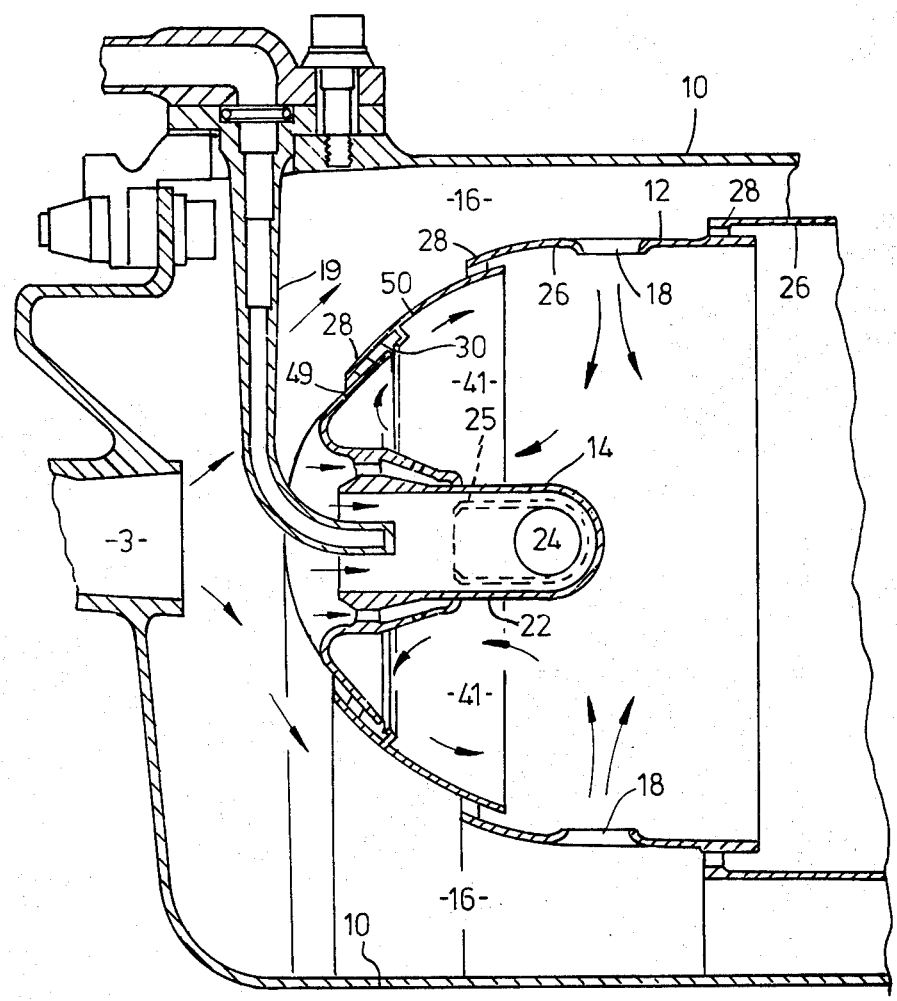
Figure 3:
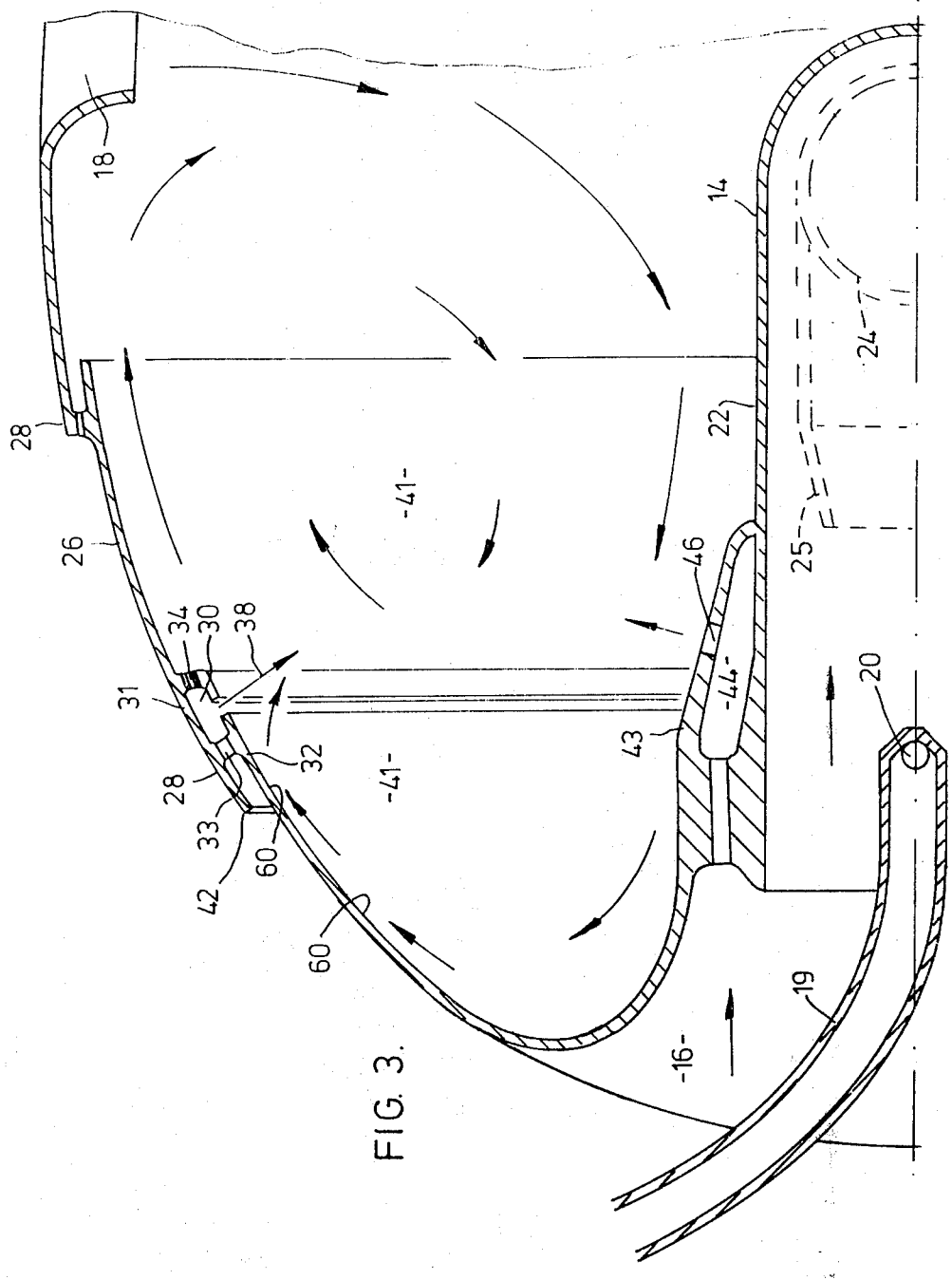
Figure 4:
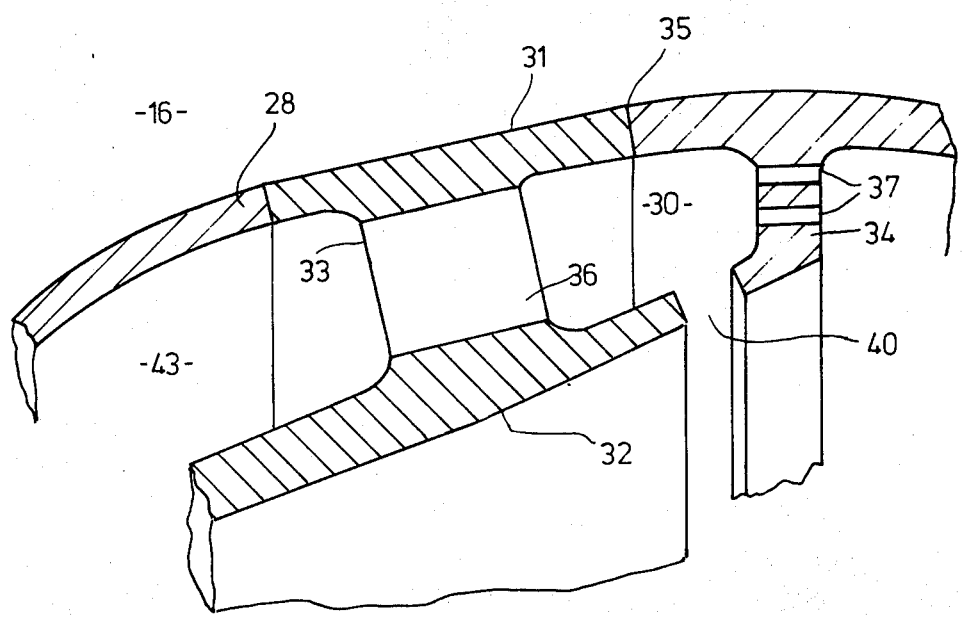

An example of the invention will now be more particularly described, by way of example only, with reference to the accompanying drawings, in which:

FIG. 1 is a diagrammatic representation of a gas turbine engine incorporating a combustion chamber according to the present invention, FIG. 2 is a part vertical section, to an enlarged scale, of the combustion chamber of the engine of FIG. 1, showing the upstream end only of the flame tube, FIG. 3 is a further enlarged view of a portion of FIG. 2, and, FIG. 4 is a portion of FIG. 4 to an even larger scale.

Referring now to the drawings, in FIG. 1 there is illustrated a gas turbine jet propulsion engine including a compressor 2, a combustion chamber 4, a turbine 6 and a propulsion nozzle 8 arranged in flow series in known manner.

The combustion equipment comprises an outer casing 10 and a flame tube 12 (FIG. 2). Air is supplied to the flame tube from a compressor delivery duct 3, some of the air passing directly into the flame tube through vaporizers 14, whilst the majority of the air supplied passes into the space 16 between the flame tube and the outer casing, and from there passes into the flame tube through apertures 18 in the wall thereof. Fuel supply pipes 19 supply fuel to the vaporizer through apertures 20, where it is mixed with the air and vaporized due to the heat in the surrounding gas in the flame tube.

The vaporizers 14 are of substantially T-section, each of which has a cylindrical stem 22 which is connected to the flame tube at its upstream end and has circumferential branches 24 at its downstream end. Only one branch 24 is shown in the drawings and that one is in broken lines being hidden by the stem 22. The circumferential branches 24 terminate in upstream facing tubes 25 from which a mixture of vaporized fuel and air issues in the upstream direction. A proportion of this mixture issues from tubes 25 in the form of vapor but a larger proportion has been found to remain in the liquid state and it has been found that this liquid fuel contacts the head of the flame tube at the annular region marked with the reference 60 and is carried in a downstream direction around the head of the flame tube as a thin "sheet" of fuel on the flame tube wall. Air entering the combustion chamber from passage 16 through apertures 18 sets up a primary combustion zone in the form of a vortex 41 shown by the arrows. In order to cause the sheet of fuel to become detached from the wall and enter the primary combustion zone a continuous annular air jet is provided, as hereinafter described, which extends inwardly from the flame tube wall and acts as a barrier for the fuel on the wall.

The flame tube wall comprises a plurality of axially extending wall portions 26 which are kept relatively cool by the air flow along the passage 16. The portions 26 are axially separated by cooling ring portions 28 which provide a flow of cooling air from the passage 16 to the inner surface of the flame tube wall.

One of the cooling ring portions plurality in this example, that one nearest to the head of the flame tube, is constructed so as to define an annular chamber 30. The chamber has a radially outer wall portion 31, which forms part of the flame tube wall, and a radially inner wall portion 32, the wall portions 31,32 being radially separated by radially extending upstream and downstream end wall portions 33 and 34 respectively.

The upstream end wall portion 33 has an annular array of large apertures 36 through it communicating between the passage 16 and the interior of the chamber 30 whereby a quantity of air is supplied to the chamber from passage 16. The downstream end wall portion 34 is provided with a plurality of relatively smaller holes, or apertures, 37 through which a portion only of the air supplied to chamber 30 can pass to establish a cooling film over the inside of the adjacent downstream wall portion 26 of the flame tube wall. The remaining portion of the air supplied to chamber 30 passes out of the chamber through a continuous annular slot 40 as a pressure jet, and forms an annular "curtain" of air extending inwardly from the flame tube wall. This "curtain" of air is shown by arrow 38; it acts as a pneumatic barrier to the sheet of fuel which is attached to the wall at the head of the flame tube and effectively projects this fuel into the primary zone.

The sizes of the apertures 37 and the annular slot 40 are separately selected to produce optimum flow proportions respectively for the cooling film flow and for the effectiveness of the annular "curtain".

Apart from the benefit of preventing fuel from remaining attached to the wall of the flame tube the invention provides further advantages as follows:

1. The inward direction of a quantity of air in a continuous annular jet helps to promote the formation of a vortex in the primary zone of the flame tube and this promotes mixing of the fuel and air and improves combustion.
2. The annular air "curtain" acts as a flame stabilizer. Whether it causes a local weakening in the air/fuel ratio which stabilizes the flame or whether it provides a local sheltered zone on which the flame stabilizes is not quite certain but it certainly revises fuel placement such that combustion efficiency is improved and organic pollutants reduced.

As an additional feature, the stem of each vaporizer is surrounded by a shroud 43 which is radially spaced from the stem to define an annular passage 44 which is supplied with cooling air from the compressor delivery duct 3. The downstream end of the annular passage 44 is closed and holes 46 are formed in the shroud to allow air to emerge substantially radially of the stem. The radial air jets from the vaporizer shroud holes 46 emerging into the center of the primary zone vortex cause further turbulence and further improve mixing in the primary zone 41.

The example described illustrates one of the cooling ring portions of the flame tube wall being provided with an annular chamber 30 close to the head of the combustion chamber. Clearly more than one annular chamber may be provided if desired at various positions along the flame tube wall, the cooling film on the interior surface of the flame tube wall being re-constituted in each case by calibrated apertures in the downstream end wall of each chamber.

The outer wall of the chamber may have a forward extension 42 which, as shown, may be convergent towards the head of the flame tube in the upstream direction, thus providing in effect a diffusing passage 43 for air from the passage 16 prior to its passing through the apertures 36 into the chamber thus giving a higher static pressure in the chamber 30. The external shape of forward extension 42 ensures flow attachment over the outer surface of the downstream section.

The cooling ring portion of the wall of the flame tube may be made in a number of separate annular sections, for example, the end walls 32 and 34 may be made from separate machined rings welded together at 35. The cooling ring portion is then welded to the flame tube wall at 49 and 50 (FIG. 2). With this arrangement the annular slot 40 can be finally machined after assembly of the two end wall portions but before the cooling ring portion is attached to the flame tube wall. Also the annular slot 40 may be in the form of a series of part annular slots so as to be substantially continuous with small spaced bridges spanning the slot to give structural strength across the slot but not to interfere with the air flow out of the duct.

The invention has been found to be of particular value in achieving good combustion at low powers and it enables a considerable reduction in pollutants to be made at engine idling or low ground running powers.

We claim:

1. A gas turbine engine combustion chamber comprising a flame tube having an annular wall, an upstream end wall and a fuel vaporizer extending into said flame tube from the end wall; a hollow stem for said vaporizer extending in a generally downstream direction from the end wall and to which, in operation, air and fuel are delivered separately; at least one radial branch connected to the hollow stem through which there passes a mixture of said fuel and air from the hollow stem, said radial branch terminating in a generally upstream facing opening for delivery of said mixture into the flame tube; radially inner and radially outer wall portions for said annular wall; means defined by said inner and outer wall portions for allowing air to pass into the flame tube and means provided by said inner wall portion defining a substantially continuous inwardly facing slot extending around the annular wall of the flame tube and communicating with the interior of the flame tube for the passage of air therethrough into the interior of the flame tube in a continuous inwardly directed curtain normal to the inner wall portion.

2. A gas turbine engine combustion chamber as defined by claim 1, which further comprises a cylindrical shroud surrounding and radially spaced from the hollow stem to define an annular space for receiving a supply of air but not fuel, the cylindrical shroud having means defining holes provided in the wall thereof through which in operation air passes out of said annular space in a direction substantially radially of the stem to mix with the mixture of air and fuel discharged from the radial branch of the hollow stem and does not impinge upon said radial branch.

3. A combustion chamber according to claim 1, wherein said inner and outer wall portions define an annular chamber therebetween and the slot means communicates with said chamber around the circumference.

4. A combustion chamber according to claim 1, wherein said inner and outer wall portions define an annular chamber and means is provided forming a series of apertures for delivering air from said chamber to form a film of cooling air on the flame tube wall downstream of said chamber.

5. A combustion chamber according to claim 1, wherein said inner and outer wall portions define an annular chamber and means is provided forming a series of apertures for receiving air into said chamber from exterior to and upstream of said chamber.

6. A combustion chamber according to claim 5, wherein the inner and outer wall portions extend upstream of said chamber to form a diffusing passage for air entering said apertures.

* * * * *